G. W. DRAKE.
MECHANISM FOR FEEDING BLANKS.
APPLICATION FILED JULY 31, 1913.
1,218,987.
Patented Mar. 13, 1917.
3 SHEETS—SHEET 1.
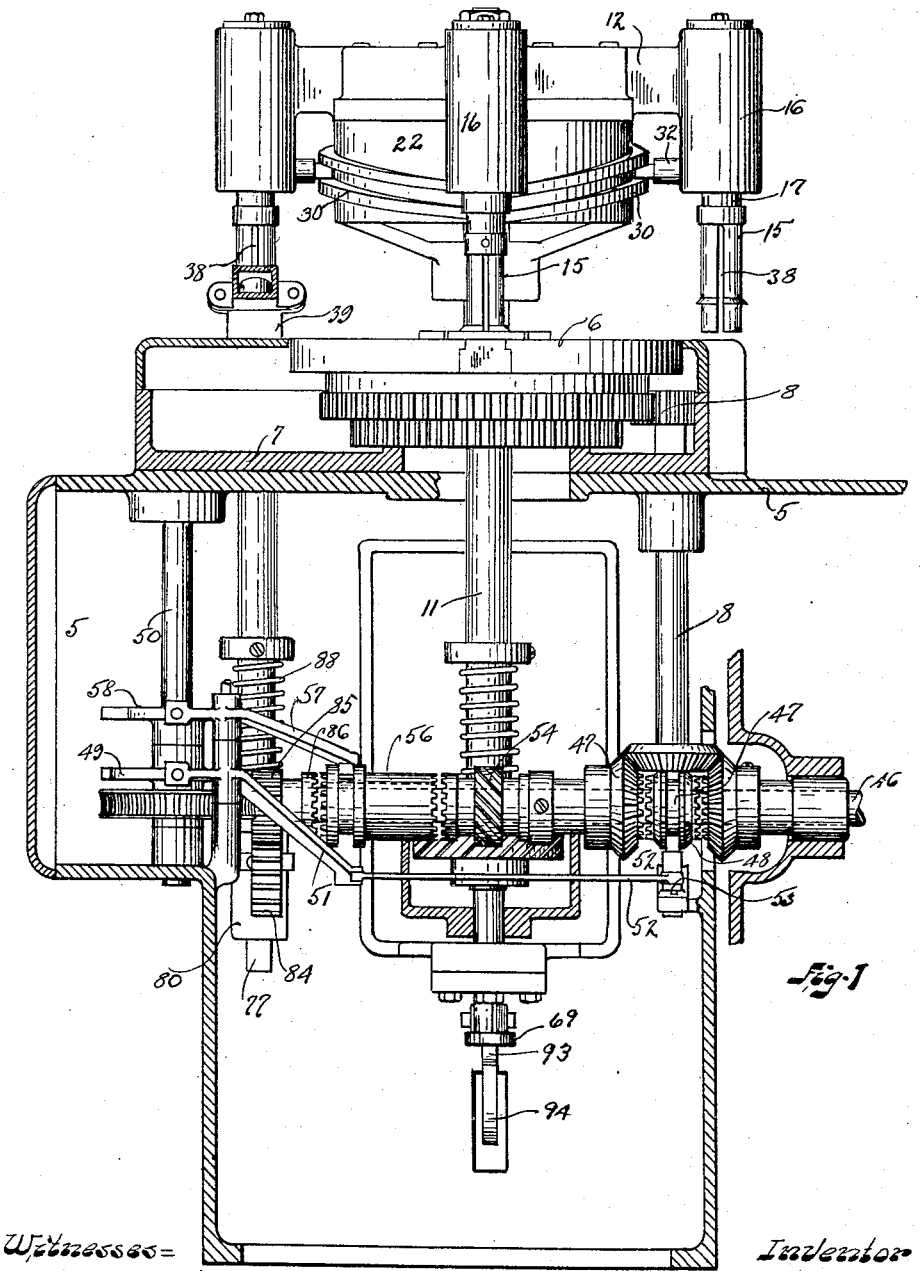

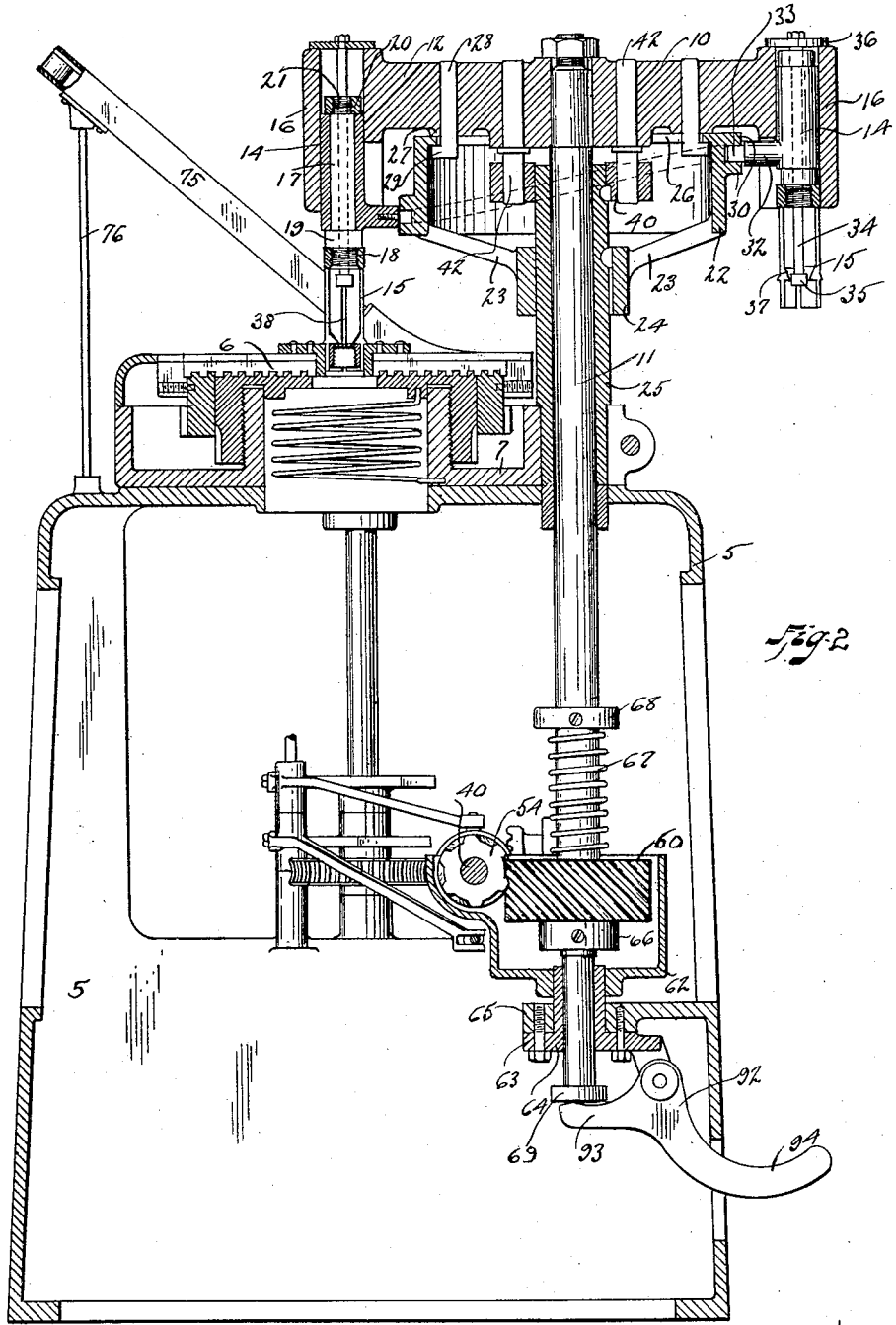

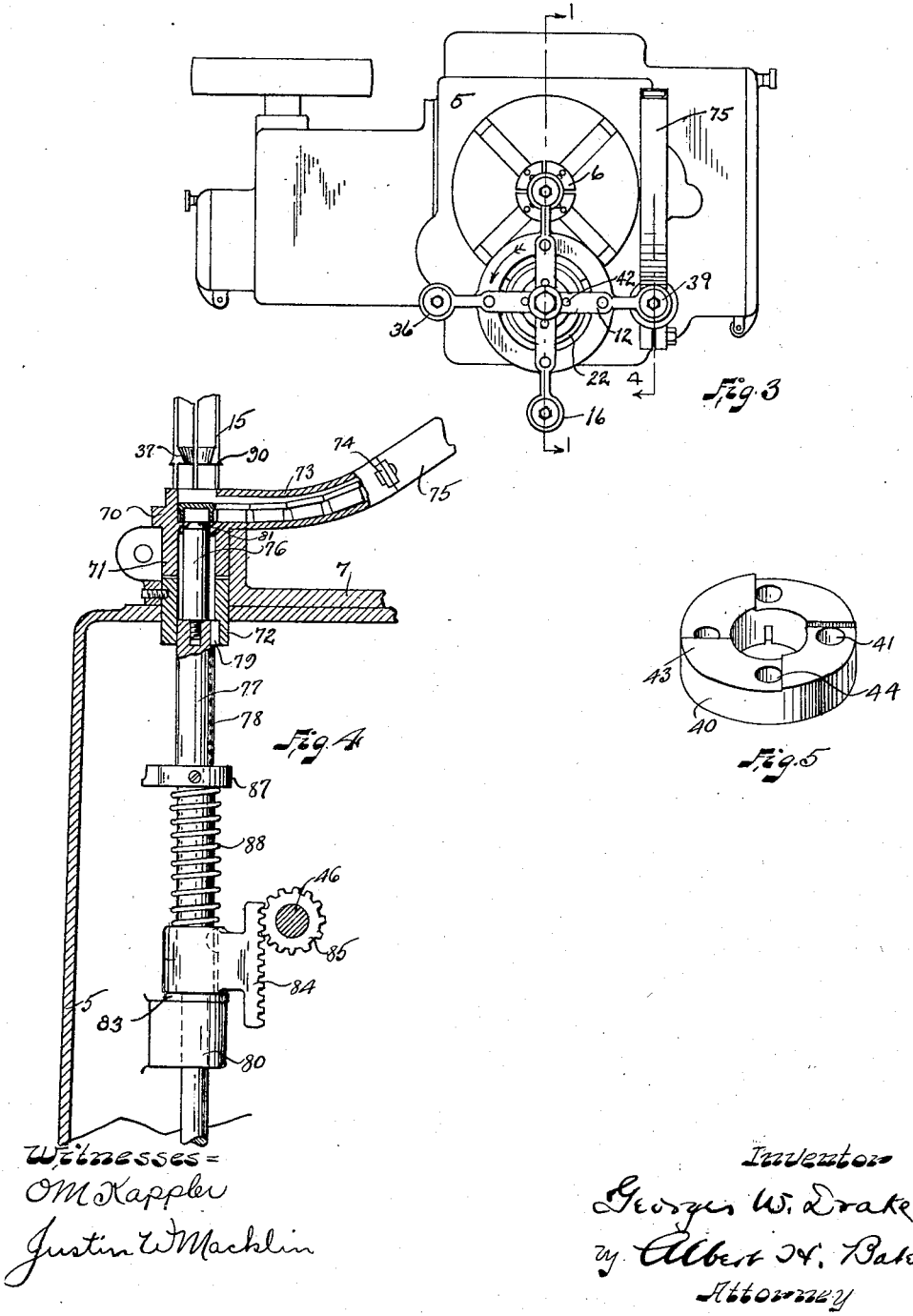

UNITED STATES PATENT OFFICE.

GEORGE W. DRAKE, OF SOUTH EUCLID, OHIO, ASSIGNOR, BY MESNE ASSIGNMENTS, TO GEORGE W. BOWEN, OF AUBURN, NEW YORK.

MECHANISM FOR FEEDING BLANKS.

1,218,987.      Specification of Letters Patent.      Patented Mar. 13, 1917.

Application filed July 31, 1913. Serial No. 782,184.

*To all whom it may concern:*

Be it known that I, GEORGE W. DRAKE, a citizen of the United States, residing at South Euclid, in the county of Cuyahoga and State of Ohio, have invented a certain new and useful Improvement in Mechanism for Feeding Blanks, of which the following is a full, clear, and exact description, reference being had to the accompanying drawings.

This invention is for a mechanism for automatically feeding small articles to a machine adapted to operate upon them. It is particularly adapted to transfer such articles as nuts, bolts, grease cup parts or similar articles from a magazine to the chuck of a machine designed to receive them. An object of the invention is to provide such a feeding mechanism which shall be entirely automatic, shall be highly efficient and adapted for coöperating with a machine to which the blanks are fed.

In the embodiment shown in the drawings, my mechanism is adapted for feeding grease cup caps from a magazine to the chuck of an internal thread milling machine, of which it may form a part. This thread milling machine, a portion of which is shown in the drawings, forms the subject matter of a separate application of Oscar Zerk and George W. Drake Sr. No. 782,183, filed July 31, 1913.

My feeding mechanism has a rotatable turret carrying several spring collets which act as grippers for the caps. These collets are vertically slidable in the turret and the turret is also adapted to be vertically movable to facilitate the insertion of the cap into the chuck, the removal therefrom and ejection of the caps from the collets. This will be hereinafter more fully described in connection with the drawings.

Figure 1 is an elevation of my device, the milling machine being sectioned to show the operating mechanism. Fig. 2 is a central vertical section of the same taken through the chuck of the milling machine and showing a portion of the operating mechanism. Fig. 3 is the plan of my device showing the milling machine. Fig. 4 is a vertical section through the mechanism for feeding the blanks from the magazine to the collets of the feeding mechanism. Fig. 5 is a detail of the block for stopping and locking the turret.

The frame of the machine with which my device is used is designated 5. On the top of this box-like frame is a rotatable scroll chuck 6, mounted on a bearing casting 7 and adapted to be opened and closed by means of mechanism 8. Suitable mechanism, not shown, may be used to rotate the chuck. 10 indicates a turret rigidly mounted on an upper end of a shaft 11 and having radial arms 12 projecting from a hub surrounding the shaft 11. Each of these arms carry, at their outer ends, a slide 14. Occupying an axial bore in each slide is a shank 17 having a threaded projection 18 at the lower end upon which the collet 15 is adapted to be screwed. A suitable shoulder is formed at 19 between the threaded portion and the slide 14, and at the opposite end of the shank a nut 20 is screwed onto a threaded extension 21, thus suitably securing the shank 17 against end movement while allowing a free rotation within the slide 14.

Just beneath the arms 12 is a hollow cylindrical drum 22, carried on arms 23, rigid on the hub 24 which is suitably splined to a sleeve 25, mounted in the frame of the machine and forming a bearing for the shaft 11. At the upper end of this drum is an inwardly turned flange forming a flat surface at the upper edge of the drum upon which rest lugs 27 formed on the arms 12. Extending through these lugs and through the arms are pins 28 having hooks 29 at their lower ends engaging the under edge of this flange 26. Thus it will be seen that as the turret is raised, by pushing upwardly on the shaft 11 by means to be hereinafter described, the drum 22 will be carried with it. The drum, however, is not rotatable as it is suitably splined to the sleeve 25 which is rigid in the frame 5 of the machine and supported by a portion of the casting 7. On the exterior of this drum are two ribs 30, forming a cam slot, leading from the lower edge of the drum on one side, to the upper edge of the drum on the other side. The drum will be hereinafter referred to as the cam drum. Projecting from the slides 14 are short arms 32 each carrying at the inner end a roller 33 adapted to engage this cam slot, to move the slide up and down as the turret is rotated about the cam drum.

As before stated, the shaft 11 is made slidable in the sleeve 25 which is rigidly carried on the frame of the machine. Thus to remove the cap from the operative position, shown particularly in Fig. 2 the turret 10 is raised by pushing upwardly on the shaft 11, which slides freely in the sleeve 25, to raise the collet from the chuck and then the turret is rotated. This brings a fresh blank into position over the chuck and then it is only necessary to lower the shaft and the turret into the position shown in Figs. 1 and 2, thus inserting the end of the collet 15 into the chuck of the machine, where it is thereafter gripped by the chuck and the cap operated upon by the machine.

The shank 17, carrying the collet, has an axial bore through which extends a rod 34 having at its lower end a head 35. These rods are suitably secured to a disk-like cover 36 rigid over the upper end of the cylindrical guideway 16. Near the lower end of the collet is an inwardly projecting flange 37, having a squared under side, to abut the cap. The upper side is beveled so that the head 35 may spread the collet to release the cap when the slide is in the position shown at the right in Figs. 1 and 2. Longitudinal slots 38 in the collets allow this spreading of the lower portion. Now, as the slide 14 is raised by means of the cam 30, the cap is brought upwardly against the head 35, which spreads the collet, as just described, allowing the cap to drop, leaving the collet ready for the reception of another blank. Accordingly, it is convenient to arrange the mechanism for inserting the blanks into these collets 15 in a position which is one-quarter of a rotation from the operative position. In the arrangement shown in the drawing, the turret is rotated from left to right, as indicated by the arrow in Fig. 3. A suitable means for inserting the blank into the collet is provided at 39 (Figs. 1 and 3).

In order to provide for stopping the turret in the exact position at each quarter turn, I provide a ring 40 secured to the upper end of the sleeve 25. Four holes 41, the centers of which are 90° apart and into which pins 42, secured in the hub of the turret, are adapted to slide, are provided in this ring. On the upper surface of the ring, shown in detail in Fig. 5, are formed four cams 43, each having a lower portion adjacent each of the holes 41, thus forming shoulders 44 rising from one side of each hole. Accordingly, as the turret is raised, the pins 42 are freed from the holes 41 and the turret is then turned a quarter rotation, with the pins sliding upon the cam surfaces 43 until they abut the shoulders 44, which stops the rotation of the turret and allows it to drop, bringing the collet carrying the fresh cap into the chuck, and also bringing the next collet over the loading mechanism, which will be hereinafter described.

A portion of the driving mechanism of the thread milling machine, with which my device is shown as used, constitutes a shaft 46 running horizontally through the machine and having thereon a pair of bevel gears 47 facing each other and loosely mounted upon the shaft. These gears are adapted to be clutched with the shaft by means of a clutch member 48 under the control of a cam 49 and a cam shaft 50, with which it is connected by means of a bell crank 51, a rod 52, and a lever 53 carrying a roller engaging a groove on the clutch member 48. This automatically drives the mechanism 8, heretofore mentioned, alternately in opposite directions to open and close the chuck 6.

Loosely mounted on this shaft 46 is a spiral gear 54 adapted to be clutched with the shaft by means of a slidable clutch 56, under the control of a bell crank 57 operated by a cam 58 on the cam shaft 50. Rigid on the lower portion of the shaft 11 is a spiral gear 60 meshing with the spiral gear 54. Surrounding these two spiral gears 54 and 60 is a suitable gear cover 62, which is cup-shaped and forms a part of a lubricating system, not shown. This gear cover is mounted on the exterior of a collar 63 having a flange 64 secured to an inwardly turned wing 65 rigid with the frame 5, thus forming a suitable bearing for the lower end of the shaft 11.

The gear 60 is splined to the shaft 11 and is held in position by a collar 66 secured to the shaft, against which the gear abuts under the influence of a spring 67 between the gear 60 and a second collar 68, also secured to the shaft 11. This spring acts to take the shock of the sudden upward movement of the gear 60. The operation of the raising and turning of the turret by means of the gears 60 and 54 is as follows: when the clutch 56 is moved to clutch the gear 54 with the constantly rotating shaft 46, the shaft 11 is prevented from turning by means of the pins 42 being in engagement with the ring 40 on the collar 25, heretofore described. Accordingly, the first movement of the gear 54 can only raise the gear 60 and the shaft 11 until the pins 42 are raised out of engagement with the collar 40, the further rotation of the gear 54 rotates the gear 60 in a direction corresponding to the arrow in Fig. 3 for nearly a quarter of a rotation, at the end of which the clutch 56 is thrown out of engagement with the gear 54, thus allowing the turret to be carried the remainder of its movement by means of its momentum. A collar 69 secured to the lower end of the shaft 11 limits the upward movement of the shaft and insures the rotary movement of the gear 60 after the shaft is free to rotate. It will be understood that the angles of the teeth of these gears are such, that the gear 54 acts equally well to raise and to rotate the gear 60. When the pins 42 come against the shoulders 44 and over the holes 41, the turret drops into the position shown in Figs. 1 and 2, thus bringing the collet carrying the cap to be milled into the operative position in the chuck, and the collet next in order into position over the feeding mechanism, which will now be described.

A head 70 having a cylindrical portion 71 is securely held in a suitable bore in a portion of the casting 7. The upper end of this head 70 is preferably made integral with a rectangular radial guideway 73, which is turned upwardly at its outer end, and is provided with suitable ears 74, to which a magazine chute 75 may be suitably secured. This chute 75 may be of any convenient length, and may be supported near its upper end by a suitable rod 76 resting upon the upper portion of the frame 5. This chute 75 is suitably inclined so that the caps will travel down it by their own weight, forcing the caps through the rectangular portion 73 and into position, one at a time, over a reduced end 76 of a plunger 77. The end 76 of the plunger is adapted to enter the caps and push them upwardly into the collets 15. The caps rest on a shoulder 81 forming a guide for the reduced end 76 of the plunger. This plunger is provided with a key-way 78 engaging a key 79 in a guide collar 72 surrounding the upper end of the plunger, while the lower end is guided by a bearing 80 rigid with the frame of the machine. Splined to the plunger adjacent to this bearing 80 is a sliding collar 82 having rigid thereon a rack 84 meshing with a gear 85 on the shaft 46. This gear 85 is adapted to be clutched with the shaft, by means of clutch teeth 86 engaging corresponding clutch teeth on the clutch member 56 heretofore described. Above the collar 82 is a collar 87 secured to the plunger, and between these collars is a spring 88 adapted to receive the upward thrust of the collar 82 and move the plunger upwardly, while allowing the collar 82 to slide on the shaft harmlessly in case a cap should become caught, crossed, or wedged, preventing the plunger rising. Another collar 83 is secured to the plunger beneath the collar 82 to limit its downward movement on the plunger.

Now, when the turret has been rotated to bring a fresh cap into operative position in the chuck of the milling machine, at the same time bringing one of the collets 15 down in position to register with the bore of the head 70, the clutch 56 is moved to clutch the gear 85 with the shaft 46 to move the rack 84 meshing therewith, moving the collar 82 upwardly, carrying the plunger with it. This shoves upwardly on the cap which is in position over the end of the plunger and raises it into the collet, up to the flange 37.

Pivotally mounted on the flange 64 of the bearing 63 is a lever 92 having an arm 93 engaging the lower end of the shaft 11, and an arm 94 projecting outwardly through a suitable opening in the frame of the machine. This lever may be used to raise the shaft 11 by depressing the arm 94 with the foot, when it is desired to raise the turret for changing the collets, making adjustment, etc.

The entire operation of my device is as follows: The cap, having been suitably milled or otherwise operated upon by the machine, is released by the opening of the chuck 6. Thereupon the clutch member 56 is moved to engage the gear 54 which is thereby rotated, and the shaft 11 is raised until the pins 42 are out of engagement with the holes 41 in the ring 40. Then the further rotation of the gear 54 rotates the gear 60, carrying with it the shaft 11 and the turret 10 nearly a quarter of a rotation, when the clutch member 56 is unclutched, allowing the turret to complete its quarter rotation by momentum until the pins engage the shoulders on the ring 40. Thereupon the turret, with its mechanism, is allowed to drop, bringing the collet 15 carrying the fresh cap into position to be gripped by the chuck of the machine, and, at the same time, bringing the empty collet over the feeding mechanism, as described. As the turret is rotated, the arm 32 carrying the roller 33 in engagement with the cam on the cam drum causes the slide 14 and the collet carrying the finished cap to be moved upwardly, causing the plunger head 35 to spread the collet, allowing the cap to drop. On the next movement of the turret, after another milling operation, an empty collet is brought downwardly by means of the return portion of the cam to the loading position, and then to milling position, as described.

It will be seen from the foregoing description that my mechanism is simple to construct, efficient in operation, and entirely automatic. It will be seen that, by changing the gripping devices herein shown as the collet 15, a wide range of articles may be handled by my feeding mechanism, which might well be used in connection with many kinds of machines.

Having thus described my invention, what I claim is:

1. The combination with a chuck, of a rotatable turret, means on the turret for holding the article to be operated on by the chuck, said means being movable into the chuck to hold the article therein, and means for actuating the turret, substantially as and for the purpose described.

2. The combination with a chuck, of a rotatable turret, means on the turret for holding the article to be operated on by the chuck, said means being movable into the chuck to hold the article therein, and being rotatable relatively to the turret with the chuck, and means for actuating the turret, substantially as and for the purpose specified.

3. The combination with a chuck, of a rotatable turret, means on the chuck for grasping an article, and means for intermittently rotating the turret and moving the same axially to bring said means into and out of alinement with the chuck and into and out of the chuck, substantially as and for the purpose set forth.

4. The combination of a rotatable and axially slidable turret, slidable means carried on the turret for holding an article, means for successively rotating and moving the turret along its axis, and means for moving the article holding means in the turret consequent upon the rotation of the turret.

5. The combination of a rotatable turret, slidable means carried on the turret for holding an article, means for rotating the turret, and for moving the turret along its axis, means for moving the article holding means in the turret after the rotation of the turret to release the article consequent upon the rotation of the turret.

6. The combination, with a chuck, of a rotatable turret, means carried upon the turret for holding an article, means for rotating the turret and moving the same laterally, and means for stopping the turret with the article in position to be grasped by the chuck, said article holding means being rotatable.

7. The combination of article feeding means, article receiving means, the latter means being movable into position to receive articles from the feeding means, a rotatable carrier, and means supported by the carrier for engaging the article receiving means, the last named means being movable relatively to the feeding means and to the receiving means, substantially as and for the purpose set forth.

8. The combination with a chuck, a rotatable turret, a slidable part carried by the turret, means for rotating the turret to carry said part into and out of alinement with the chuck cavity, and means for sliding said part toward and from the chuck cavity when alined therewith, substantially as and for the purpose set forth.

9. The combination, with a chuck, of a rotatable turret having a plurality of slides thereon, collets rotatably carried in said slides, means for rotating the turret, means for moving the slides consequent upon the rotation of the turret, and means for locking the turret in position to allow the chuck to grasp the outside of the collet.

10. The combination of a rotatable turret, a chuck, means on the turret for grasping an article to be grasped by the chuck, a magazine for holding the article, means for rotating the turret intermittently and moving it along its axis, and means for stopping the turret with an article holding means over the magazine and an article holding means in position in the chuck.

11. The combination of a rotatable turret, means for moving the turret first along its axis and then on a continued movement of said means rotating the turret, and means for driving said last mentioned means intermittently.

12. The combination of a turret, a shaft, a bearing in which said shaft is loosely mounted, a spiral gear on the shaft, a spiral gear meshing therewith, and means for driving the said last mentioned gear to move the shaft along its axis and then rotate the shaft.

13. The combination of a turret, a shaft, a bearing in which said shaft is loosely mounted, a spiral gear on the shaft, a second spiral gear meshing therewith, a clutch controlling the second spiral gear to move the shaft along its axis and then rotate the shaft, and a cam controlling the clutch.

14. The combination, with a machine having a chuck adapted to grasp an article and operating mechanism therefor, of a rotatable turret adapted to slide along its axis, means on the turret for grasping an article to be held in the chuck, means for rotating the turret to bring the article into position over the chuck, said means adapted to move the turret along its axis to remove the article from the chuck, and a clutch adapted to control said driving means, said clutch being controlled by the operating mechanism of the machine.

15. The combination, with a machine having a chuck adapted to grasp an article, of a rotatable turret adapted to slide along its axis, means on the turret for grasping an article to be held in the chuck, means for rotating the turret to bring the article into position in the chuck, said means adapted to move the turret along its axis to remove the article from the chuck, and a clutch adapted to control said driving means.

16. The combination of a rotatable turret, a slide carried thereon, means carried by the slide for holding an article, a magazine adapted to lead the article to a position where it may be received by the article holding means, means for moving the article from the magazine to the holding means and means for moving the slide.

17. The combination of a rotatable turret, of means carried by the turret for holding an article, means for moving the turret along its axis, a chuck for grasping the article holding means carried by the turret, said means being rotatable, a magazine adapted to bring the articles to a loading position, and a plunger adapted to move the article from the magazine to the article holding means on the turret.

18. The combination of a rotatable turret, of means carried by the turret for holding an article, means for moving the turret along its axis, a chuck for grasping the article holding means carried by the turret, said means being rotatable to allow for the rotation of the chuck, a magazine adapted to bring the articles to a loading position, a rack carried by said plunger, and a gear engaging the rack for moving the plunger.

19. The combination of a rotatable turret having a plurality of slides thereon, of collets rotatably carried by such slides, said collets adapted to spring over an article to be carried thereby, means for moving the collets consequent upon the rotation of the turret, said turret being slidable along its axis, means for so sliding it and then rotating it, and means for locking the turret in the desired position.

20. The combination of a rotatable turret, a plurality of slides carried thereby, spring collets carried by said slides, a cam for moving said slides, the turret being longitudinally movable, said cam being adapted thereto to be moved therewith, and a bearing for said cam.

21. The combination of a rotatable turret, slides carried by such turret, collets carried by said slides, said turret being longitudinally movable, a drum, a bearing for said drum to which it is splined, a cam on said drum engaging the slide whereby they may be rotated consequent upon the rotation of the turret, a shaft upon which the turret is mounted, a spiral gear on the shaft, a second spiral gear meshing therewith, means for locking the turret against rotation in its lowermost position while allowing it to rotate in its upper position, and means for driving the second bevel gear to first raise the turret and then rotate it.

22. The combination of a rotatable turret, of means carried thereon for grasping an article, a shaft carrying the turret, a bearing for said shaft, a series of downwardly projecting pins carried on the turret, a block adapted to engage said pins, and means for raising the turret to bring the pins out of engagement with the block and then rotate the turret.

23. The combination of a rotatable turret, of means carried thereon for holding an article, a shaft carrying the turret, a bearing for said shaft, a series of downwardly projecting pins carried on the turret, a block adapted to engage said pins, means for raising the turret and then rotating it, and a clutch controlling said means.

24. The combination of a rotatable turret adapted to move along its axis, means on the turret for grasping an article, a shaft carrying the turret, a machine adapted to operate upon the article carried by the turret, a bevel gear on said shaft, a second bevel gear engaging therewith and adapted to be driven by the driving mechanism of the machine, a clutch controlling the driving of said gear, and a cam controlling said clutch.

In testimony whereof, I hereunto affix my signature in the presence of two witnesses.

GEORGE W. DRAKE.

Witnesses:
BRENNAN B. WEST,
ALBERT H. BATES.

Copies of this patent may be obtained for five cents each, by addressing the "Commissioner of Patents, Washington, D. C."

It is hereby certified that in Letters Patent No. 1,218,987, granted March 13, 1917, upon the application of George W. Drake, of South Euclid, Ohio, for an improvement in "Mechanism for Feeding Blanks," an error appears in the printed specification requiring correction as follows: Page 4, line 35, claim 6, for the word "laterally" read *axially;* and that the said Letters Patent should be read with this correction therein that the same may conform to the record of the case in the Patent Office.

Signed and sealed this 24th day of April, A. D., 1917.

[SEAL.]

F. W. H. CLAY,
*Acting Commissioner of Patents.*

Cl. 10—162.